United States Patent [19]
Nishiyama et al.

[11] Patent Number: 5,479,008
[45] Date of Patent: Dec. 26, 1995

[54] APPARATUS AND METHOD FOR MEASURING THE SPEED, POSITION, AND LAUNCH ANGLE OF A SPHERICAL OBJECT IN FLIGHT BY SENSING THE POSITIONS AND LENGTH OF INTERRUPTION OF ADJACENT LIGHT BEAMS

[75] Inventors: Tetsuji Nishiyama, Akashi; Takashi Teraguchi, Kakogawa, both of Japan

[73] Assignee: Sumitomo Rubber Industries, Ltd., Kobe, Japan

[21] Appl. No.: 246,156

[22] Filed: May 19, 1994

[30]     Foreign Application Priority Data

Jun. 7, 1993 [JP] Japan ................................. 5-164173

[51] Int. Cl.⁶ ................................................. H01J 40/14
[52] U.S. Cl. ................. 250/222.1; 273/26 R; 273/181 H
[58] Field of Search ........................... 250/222.1, 221, 250/561, 553; 356/375; 273/183.1, 184 R, 185 R, 185 B, 26 R, 181 H, 29 A, 371; 340/555, 556, 557; 434/252

[56]             References Cited

U.S. PATENT DOCUMENTS

| | | | |
|---|---|---|---|
| 3,229,975 | 8/1962 | Tompkins et al. | 273/26 |
| 3,727,069 | 4/1973 | Crittenden, Jr. et al. | 250/222.1 |
| 3,814,438 | 6/1974 | Baron et al. | 273/185 R |
| 4,542,906 | 9/1985 | Takase et al. | 273/185 R |
| 4,563,005 | 1/1986 | Hand et al. | 273/26 R |
| 4,763,903 | 8/1988 | Goodwin et al. | 250/222.1 |
| 4,770,527 | 9/1988 | Park | 250/222.1 |
| 4,949,972 | 8/1990 | Goodwin et al. | 273/181 H |
| 5,067,718 | 11/1991 | Knox et al. | 273/185 R |
| 5,160,839 | 11/1992 | Nishiyama et al. | |

*Primary Examiner*—Edward P. Westin
*Assistant Examiner*—Steven L. Nichols
*Attorney, Agent, or Firm*—Armstrong, Westerman, Hattori, McLeland & Naughton

[57]                    ABSTRACT

A ray projecting means emitting a plurality of parallel rays of light, a ray receiving device for detecting the incidences of the rays of light impinging on them and the interceptions of the rays of light, an instrumentation device for measuring the time for which the rays of light are blocked off by a spherical object in flight, upon detecting signals given by the ray receiving device, and an operation device comprising a computer. The parallel rays of light emitted by using the ray projecting device are arranged within a plane, and their respective positions are known quantities. The distance between every two rays of light is set such as to be less than the radius of the spherical object. The operation device is used to compute the flying velocity of the spherical object in flight on the basis of the locations of the rays of light which are blocked off, and the interceptive time of the rays of light which is measured by using the instrumentation device.

16 Claims, 5 Drawing Sheets

5,479,008

APPARATUS AND METHOD FOR MEASURING THE SPEED, POSITION, AND LAUNCH ANGLE OF A SPHERICAL OBJECT IN FLIGHT BY SENSING THE POSITIONS AND LENGTH OF INTERRUPTION OF ADJACENT LIGHT BEAMS

BACKGROUND OF THE INVENTION

1. Field of the Invention

The present invention relates to improvements in an installation for measuring an instantaneous flying position of a spherical object, and a method for measuring launch angles thereof.

2. Description of the Related Art

In order to measure an instantaneous spatial position, a vertical launch angle, or a lateral deviation angle (a horizontal launch angle) of a spherical flying object such as a golf ball, a tennis ball or the like, the following conventional methods (i), (ii), (iii) and (iv) are employed.

(i) A great number of electric codes connected to electric switches are located along an expected flight path of a spherical object. In this method, the spherical object is caused to impinge on a particular one of the codes, to thereby actuate a corresponding one of the electric switches.

(ii) A great number of transmission type or reflection type photoelectric switches are placed along an expected flight path of a spherical object, and a particular one of the photoelectric switches is actuated when a ray input for that particular switch is blocked off by the spherical object in flight.

(iii) Scanning laser beams are created, and are paralleled across an expected flight path of a spherical object by using a combination of a concave mirror with a lens system. The spherical object is made to pass through the scanning plane, to thereby measure beam cut-off timing to determine an instantaneous spatial position and launch angles of the spherical object in flight.

(iv) An image of a spherical object in flight is taken by using a video camera. An instantaneous spatial position, a vertical launch angle, or a horizontal launch angle (lateral deviation angle) of the spherical object is determined by means of image measurement.

In the foregoing first method (i), however, the contact of the spherical object in flight with each electric code affects the flight of the spherical object, and for this reason, the first method (i) is not desirable.

The second method (ii) is disadvantageous in that a great number of photoelectric switches are required to be provided in order to optically cover a wide flight path area of the spherical object and to improve the resolution of detection.

In the third method (iii), the concave mirror causes the laser beams to be inevitably irregular in their scanning translational movement owing to their mechanical motions such as their swinging or rotating motions. Moreover, the mechanical movement of the mirror may also affected by atmospheric temperatures and other ambient conditions. This makes errors in the position measurement. This is a disadvantage of the third method (iii).

In the fourth method (iv), the location in which the video camera is placed causes errors in the measurement. Moreover, the number of the pixels or the picture elements of the image, and the lighting of the flying spherical object limit the accuracy in the measurement. This is a problem of the fourth method (iv).

In order to overcome the foregoing disadvantages or problems of the conventional measuring methods, the inventors have intended an apparatus for determining instantaneous spatial position of a flying spherical object according to an invention protected under U.S. Pat. No. 5,160,839 granted to the inventors of the present application. In the apparatus disclosed in U.S. Pat. No. 5,160,839, a parallel light band is generated, and it is projected onto a screen to form a linear image region. If a spherical object in flight crosses the parallel light band, it creates a silhouette on the screen within the image region. The position of this silhouette is detected by using a sensor means, to thereby determine an instantaneous spatial position of the flying spherical object.

However, in this position determining apparatus of U.S. Pat. No. 5,160,839, the computation of the position is based upon a silhouette of a spherical object in flight, which is formed on the screen. Defects in the screen such as a slant warp or contamination, act to reduce the accuracy of the measurement.

It is therefore an object of the present invention to provide for an improved type measuring apparatus in which it is feasible to determine an instantaneous spatial position of a spherical object in flight without coming into contact therewith in a wide flight path area of the spherical object and with higher measuring accuracy.

It is another object of the present invention to provide for a measuring method in which vertical or horizontal launch angles of a flying spherical object can be measured without any contact therewith in a wide flight path area and with higher measuring accuracy.

BRIEF DESCRIPTION OF THE DRAWINGS

The present invention will be described with reference to the accompanying drawings, in which.

DETAILED DESCRIPTION OF THE PREFERRED EMBODIMENTS

Preferred embodiments of the measuring installation and method according to the present invention will be described in detail with reference to the accompanying drawings.

Figure 1:
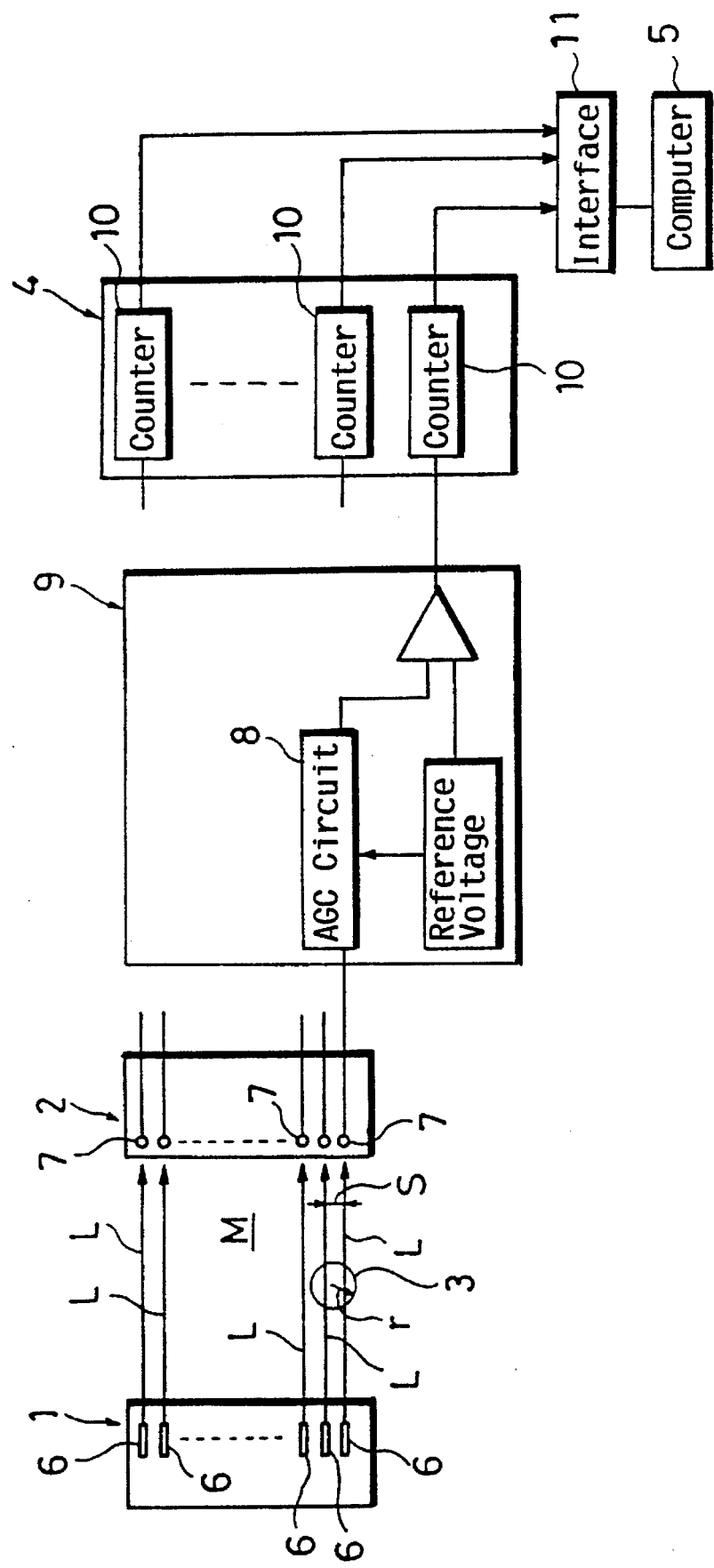
FIG. 1 is a diagram of the apparatus for measuring an instantaneous flying position of a flying spherical object according to a preferred exemplary embodiment of the present invention.

The measuring apparatus shown in FIG. 1 is provided with a ray projecting means 1 which emits a plurality of parallel rays L of light, a ray receiving means 2 which detects the incidence or blockage of the rays L of light, an instrumentation means 4 measuring the time for which a spherical object 3 blocks off the rays L of light, and a calculating means 5 for measuring an instantaneous flying position of the spherical object 3 chiefly on the basis of the blockage time of the rays L of light which is measured by means of the instrumentation means 4.

The ray projecting means 1 comprises semiconductor type laser markers 6 serving as the light sources which emit a plurality of, for example, sixteen, rays L of light having 10 mW of power thereof and a wavelength of 670 nm. Such laser markers 6 are vertically arranged at regular intervals of, for example, 16 mm.

Figure 2:
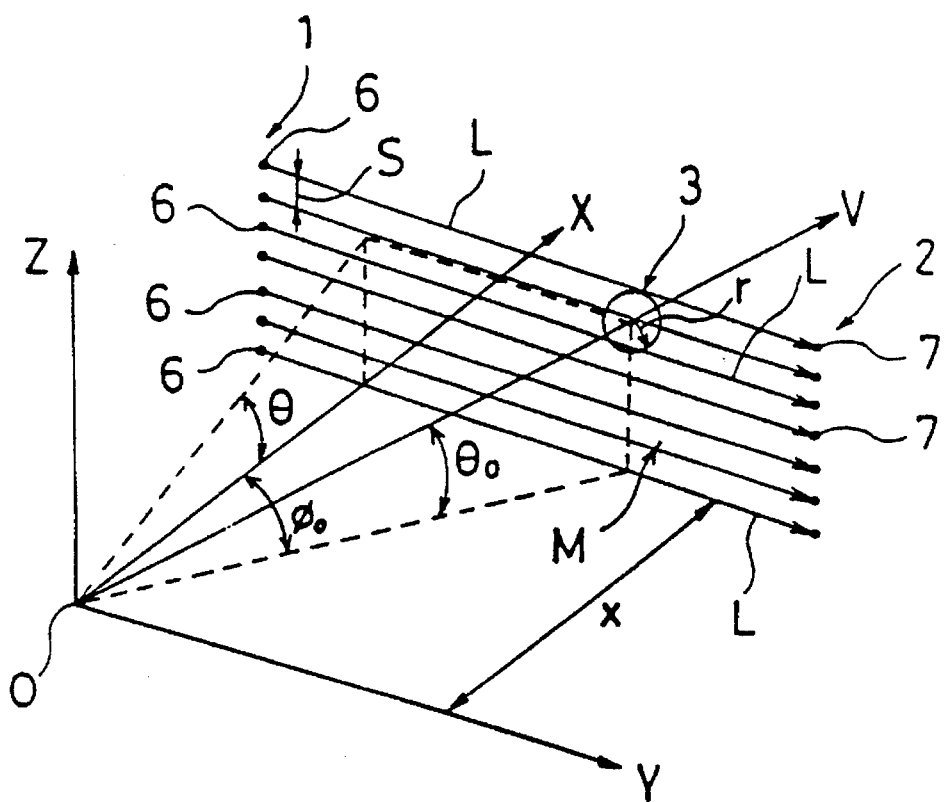
FIG. 2 is a conceptional diagram of a measuring system used in the apparatus shown in FIG. 1.

Referring to FIG. 2, the rays L of light emitted by means of the ray projecting means 1 are disposed on a single plane M (a vertical surface in the first preferred embodiment of the present invention). The plane M on which all the rays L of light are contaminated is determined in a predetermined position from a certain reference position. That is to say, the position on the plane M is known quantity. For example, in FIG. 2, if the spherical object 3 is a golf ball, the distance x to the plane M from the golf tee, namely, the shot point O, is given such as 780 mm.

Also, the distance S between every two neighboring rays L of light is set such that it does not exceed the radius of the spherical object 3, to thereby meet the inequality $S<r$, or preferably $S \leq r \times 0.95$ or approximately 0.90. Therefore, the position of each of the rays L of light is a known quantity. That is to say, this position is determined on the plane X-Z.

In the event that the distance S between every two neighboring rays L of light is set such as to be $S<r$, if the spherical object 3 passes the plane M, it crosses at least two rays L of light.

The light receiving means 2 comprises photodiodes 7 vertically arranged at regular intervals of 16 mm in correspondence to the disposition of the markers 6 of the ray projecting means 1.

In front of the photodiodes 7 or on the side of the ray projecting means 1 there is provided a masking plate through which sixteen holes of 1 mm in the diameter thereof are vertically made at regular intervals of 16 mm.

The output of each photodiode 7 is approximately 0 V unless they receive the rays L of light.

An amplifier portion 9 shown in FIG. 1 is provided with sixteen AGC (Automatic Gain Control) circuits 8 which are respectively conformed to each of the sixteen photodiodes 7. This amplifier portion 9 makes automatic gain control to allow the photodiodes 7 to respectively have an output of approximately 2 V when the rays L of light are incident upon the photodiodes of the ray receiving means 2. This is to allow the AGC circuits to compensate for a decrease in the outputs of the rays L of light, which can be caused by, for example, aging of the laser systems of the markers 6 forming the ray projecting means 1. Also, the AGC circuits are arranged to have a delayed response to the electric signals from the photodiodes 7 within the limits in which the measurement of the real blockage time of the rays L of light is not affected.

Figure 3:
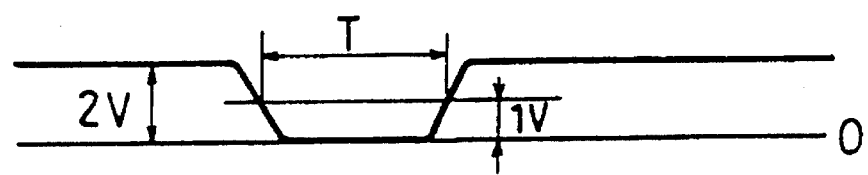
FIG. 3 is a waveform diagram of outputs of an amplifier portion which is one of the components forming the measuring installation according to the present invention.

The instrumentation means 4 measures the time T for which the output of the amplifier means 9 is below a predetermined value, such as 1 V in FIG. 3, namely, the blockage time of the rays L of light. This instrumentation means 4 is provided with a plurality of (for example, sixteen) counters 10 to measure time for which the output of each AGC circuit 8 is less than 1 V, namely, the blockage time of the rays L of light. The blockage time of the rays L of light is inputted in a computer (an arithmetic operation means) 5 to detect a single or a plurality of photodiodes 7 for which the rays L of light are blocked off.

The levels of the photodiodes 7, their spacings and other information are inputted in advance in the computer, to thereby measure a flying position of the spherical object 3 by using the following arithmetic operation method.

An instantaneous flying position of the spherical object 3 is measured based on the condition that the spherical object 3 is a golf ball, the golf ball is hit by using a golf club from the position at which it is teed up, and the golf ball flies the straight trajectory shown in FIG. 2.

In FIG. 2, the symbol $\theta_0$ represents a real launch angle of the golf ball (the angle formed by the horizontal line and the trajectory line of the golf ball on a vertical surface including the trajectory line of the golf ball, namely, a vertical launch angle of the golf ball), the symbol $\Phi_0$ a real lateral deviation angle (a horizontal launch angle) of the golf ball, and the symbol $\theta$ a value of the real launch angle of the golf ball as projected on the plane X-Z.

Figure 4:
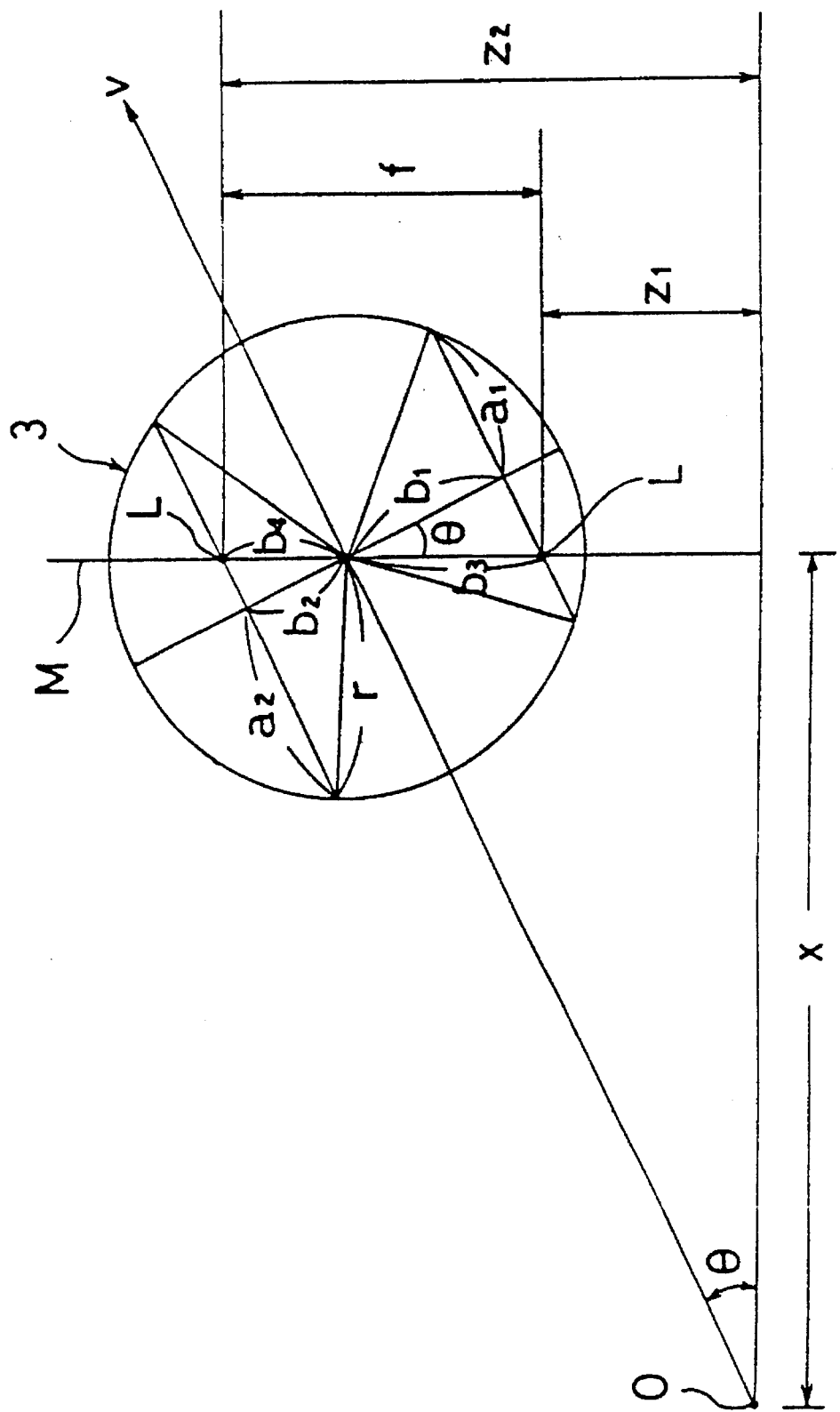
FIG. 4 is an explanatory diagram of a method for arithmetic operation for an instantaneous spatial position of a flying spherical object, which is used in the measuring installation and the measuring method of the present invention.

In FIG. 4 which shows a conceptional view of the measuring system projected on the plane XZ, the symbol x denotes the distance (780 mm) from the tee, or the shot point 0 to the plane M including the rays L of light, the symbol $Z_1$ the level (35 mm) of the lowermost photodiode 7, the symbol $Z_2$ the level (51 mm) of the second photodiode from the lowermost photodiode 7, the symbol f the distance (16 mm) between every two photodiodes 7, the symbol r the radius (21.35 mm) of the golf ball, the symbol V in FIG. 2 an actual flying velocity of the golf ball, and the symbol v a flying velocity thereof into which the actual velocity V of the golf ball is projected on the plane XZ. Moreover, the symbol $t_1$ is used to represent the time for which the rays L of light is blocked off for the photodiode at a level of $Z_1$, and the symbol $t_2$ to represent the time for which the rays L of light is blocked off for the photodiode at a level of $Z_2$.

From the preceding conditions, the following eight formulae are obtained.

$a_1 = \frac{1}{2} v t_1$ $a_2 = \frac{1}{2} v t_2$ $a_1^2 + b_1^2 = r^2$ $a_2^2 + b_2^2 = r^2$ $b_3 + b_4 = f$ $b_1 = b_3 \cos \theta$ $b_2 = b_4 \cos \theta$ $$\cos\theta = \frac{x}{\sqrt{x^2 \times (z_1 + b_3)^2}}$$

The foregoing eight equations gives the following formulae.

$$b_3 = \frac{-B \pm \sqrt{B^2 - AC}}{A}$$

in which, $A = (x^2 - r^2)(t_2^2 - t_1^2)$ $B = fx^2 t_1^2 + z_1 r^2 (t_1^2 - t_2^2)$ $C = r^2(t_1^2 - t_2^2)(x^2 + z_1^2) - f^2 x^2 t_1^2$ As described in the foregoing, the symbols x, $z_1$, f and r are known quantities. Therefore, if the time $t_1$ and $t_2$ are measured, the distance $b_3$ between the lowermost photodiode 7 and the center of the golf ball is given, to thereby calculate the level of the center of the golf ball in flight, which is expressed by $(z_1+b_3)$.

If the value of $(z_1+b_3)$ is thus obtained, the following equation gives the launch angle θ of the golf ball.

$$\theta = \tan^{-1}\frac{z_1 + b_3}{x}$$

Figure 7:
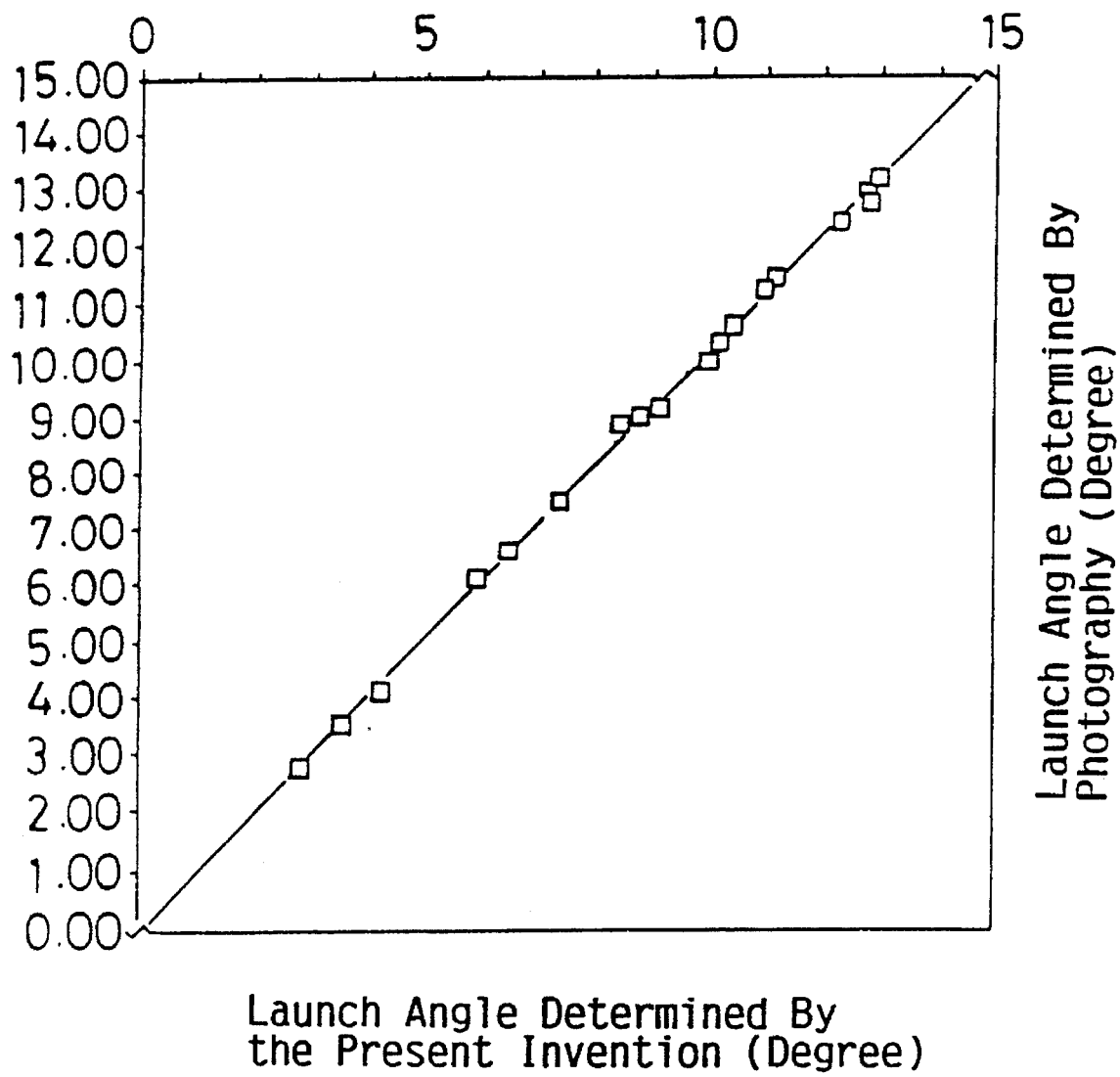
FIG. 7 is a graph showing an interrelation between the launch angles obtained by using the measuring method according to the present invention and those measured by a conventional measuring method.

FIG. 7 is a graph (scatter diagram) which shows an interrelation between launch angles obtained by using the measuring method according to the preceding preferred embodiment of the present invention and those measured by the photographic measuring method, which is a conventional measuring method with a relatively high measuring accuracy.

In the photographic measuring method, a flashlight is emitted at intervals of 3 msec., and two different images of a golf ball in flight are photographed in a single film frame which coincides in the vertical direction thereof with the normal direction of the ball. The centers of these two different images of the ball are found from a great number of points on their outer circumferential surfaces as voluntarily selected, and the launch angles of the ball are found from the two centers thus obtained.

The measuring method according to the present invention was used to experimentally measure levels $(z_1+b_3)$ of the centers of golf balls in flight, and the results of the level measurement are shown in Table 1. Also, the launch angles θ of the ball are measured, and the results of their measurement are shown in FIG. 2. In this experimental measurement, eighteen golf balls teed up were hit by using a golf club.

In Tables 1 and 2, the locations at which the rays L of light are blocked off are the levels of the rays L of light which are blocked off by golf balls. The ray L of light emitted by means of the lowermost laser marker 6 is given the number 1 to show the location thereof, and the other rays of light shed by the laser markers 6 which are placed at higher positions than the lowermost laser marker 6.

The level of each ray L of light is based on the central level of the golf ball teed up, and is given by the following formula.

{(Locational Number)–1}×16+35 (in mm)

As a result, No.1 ray L of light is 35 mm in the level thereof, No. 2 ray L of light is 51 mm in the level thereof, the subsequent higher rays L of light are successively increased in their levels by 16 mm, and No. 11 ray L of light is 195 mm in the level thereof.

Also, in Tables 1 and 2, the numerals under the encircled numbers 1, 2 and 3 which belong to the column of "Locations at which and Time (in microseconds) for which the Rays of Light are Blocked Off" represent the locational numbers of the ray L of light which is blocked off. In the column of Table 1 which shows "Central Levels of Golf Balls $(z_1+b_3)$", the numerals under the encircled numbers in pairs 1; 2, 2; 3 and 3; 1 respectively denote the central level of the golf ball which is found from the rays L of light 1 and 2 as blocked off, from the rays L of light 2 and 3 as blocked off, and from the rays L of light 3 and 1 as blocked off.

In Table 2, the launch angles θ of the golf balls are obtained from each combination of two rays L of light 1 and 2, 2 and 3, and 3 and 1 as blocked off.

In each of Table 1 and Table 2, there is provided the column marked "R" In Table 1, the "R" column shows the difference between the maximum value and the minimum value of the central level of each golf ball, and the "R" column in Table 2 the difference between the maximum value and the minimum value of the launch angle θ of each golf ball.

Also, Table 3 shows the differences between the launch angles θ of the golf balls which are found by using the measuring method according to the present invention and those of the golf balls which are given by the conventional photography method.

It is to be understood from Table 3 that both the measuring method according to the present invention and the conventional photographic measuring method indicates the substantially same launch angles θ of the golf balls, and that the launch angles θ measured by using the measuring method of the present invention and those given by the conventional photographic measuring method have a high degree of interrelationship with each other. That is to say, the measuring method according to the present invention which is feasible of simple measurement allows the launch angles θ to be measured in a wide flight path area.

Also, as shown in Table 3, in the foregoing experimental measurement, eleven of the eighteen golf balls block off all of the three rays L of light. The launch angles θ of these eleven golf balls are as shown in Table 2, and the differences between the maximum values and the minimum values of these launch angles θ range between 0.00 and 0.02 as also presented in Table 2. It is therefore to be noted that the measuring method according to the present invention achieves an extremely high accuracy of measurement of the launch angles θ of the golf balls.

Figure 5:
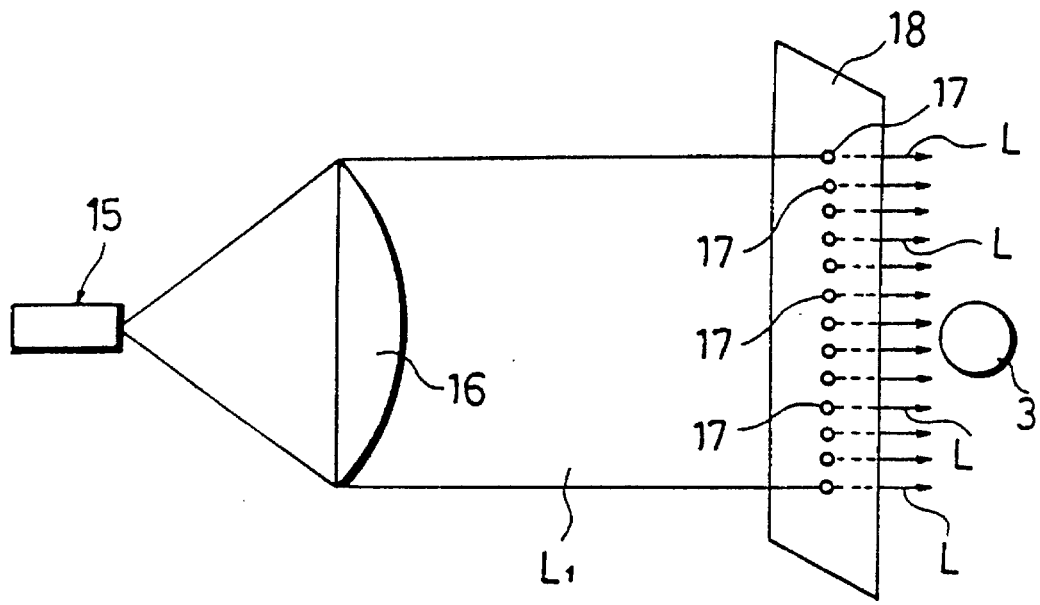
FIG. 5 is a schematic view of a principal portion of the measuring installation of the present invention according to a second preferred embodiment thereof.

FIG. 5 shows a second preferred embodiment of the measuring installation according to the present invention. This measuring installation comprises a modified type ray projecting means 1. This ray projecting means 1 is provided with a laser marker 15, a convex lens 16, and a masking plate member 18. The laser marker 15 is adapted to expand a semiconductor laser beam in a fan-shaped configuration by using a cylindrical lens. Also, the masking plate member 18 has a plurality of holes 17 vertically made therethrough at regular intervals of, for example, 16 mm.

TABLE 1

CENTRAL LEVELS OF GOLF BALLS AS MEASURED BY USING THE
MEASURING METHOD ACCORDING TO THE PRESENT INVENTION

| Locations at which and Time (micro sec.) for which the Rays of Light are Blocked Off | Central Levels of Golf Balls $Z_1 + b_3$ (in mm) |

|    | ① |       | ② |       | ③  |       | ①;② | ②;③ | ③;① | Ave. (A) | R |
|----|---|-------|---|-------|----|-------|--------|--------|--------|----------|------|
| 1  | 8 | 620.9 | 9 | 720.8 | 10 | 191.8 | 158.09 | 158.00 | 158.00 | 158.03 | 0.09 |
| 2  | 8 | 675.4 | 9 | 671.7 | —  | —     | 154.86 | —      | —      | 154.86 | —    |
| 3  | 9 | 642.4 | 10 | 651.1 | — | —     | 171.35 | —      | —      | 171.35 | —    |
| 4  | 9 | 466.2 | 10 | 689.8 | 11 | 476.5 | 179.15 | 179.16 | 179.15 | 179.15 | 0.01 |
| 5  | 7 | 506.0 | 8 | 722.5 | 9  | 474.6 | 146.51 | 146.62 | 146.57 | 146.57 | 0.11 |
| 6  | 6 | 699.8 | 7 | 662.5 | —  | —     | 121.63 | —      | —      | 121.63 | —    |
| 7  | 6 | 635.8 | 7 | 716.2 | 8  | 187.9 | 125.93 | 126.09 | 126.08 | 126.03 | 0.16 |
| 8  | 1 | 599.6 | 2 | 745.7 | 3  | 328.0 | 47.95  | 47.74  | 47.78  | 47.82  | 0.21 |
| 9  | 1 | 745.7 | 2 | 587.8 | —  | —     | 37.68  | —      | —      | 37.68  | —    |
| 10 | 1 | 217.6 | 2 | 728.3 | 3  | 634.5 | 55.47  | 55.72  | 55.49  | 55.56  | 0.25 |
| 11 | 4 | 703.6 | 5 | 680.3 | —  | —     | 90.16  | —      | —      | 90.16  | —    |
| 12 | 3 | 491.0 | 4 | 752.6 | 5  | 519.6 | 83.27  | 83.46  | 83.36  | 83.37  | 0.19 |
| 13 | 4 | 323.6 | 5 | 738.5 | 6  | 611.6 | 102.41 | 102.57 | 102.44 | 102.48 | 0.16 |
| 14 | 6 | 674.8 | 7 | 691.7 | —  | —     | 123.62 | —      | —      | 123.62 | —    |
| 15 | 7 | 700.9 | 8 | 663.4 | —  | —     | 137.61 | —      | —      | 137.61 | —    |
| 16 | 7 | 620.8 | 8 | 715.8 | 9  | 242.2 | 142.49 | 142.54 | 142.52 | 142.51 | 0.03 |
| 17 | 9 | 547.4 | 10 | 691.8 | 11 | 374.3 | 176.53 | 176.54 | 176.54 | 176.54 | 0.02 |
| 18 | 9 | 327.9 | 10 | 683.2 | 11 | 563.3 | 182.30 | 182.30 | 182.30 | 182.30 | 0.00 |
| N    |   |       |   |       |    |       |        |        |        | 18     | 11   |
| Ave. |   |       |   |       |    |       |        |        |        | 124.29 | 0.112|
| Min. |   |       |   |       |    |       |        |        |        | 37.68  | 0.00 |
| Max. |   |       |   |       |    |       |        |        |        | 182.30 | 0.25 |

TABLE 2

CENTRAL LEVELS OF GOLF BALLS AS MEASURED BY USING THE MEASURING METHOD ACCORDING TO THE PRESENT INVENTION

| | Locations at which and Time (micro sec.) for which the Rays of Light are Blocked Off | | | | | | Launch Angles of Golf Balls $\theta$ (in deg.) | | | | |
|---|---|---|---|---|---|---|---|---|---|---|---|
| | ① | | ② | | ③ | | ①;② | ②;③ | ③;① | Ave. (A) | R |
| 1  | 8 | 620.9 | 9 | 720.8 | 10 | 191.8 | 11.46 | 11.45 | 11.45 | 11.45 | 0.01 |
| 2  | 8 | 675.4 | 9 | 671.7 | — | —     | 11.23 | —     | —     | 11.23 | —    |
| 3  | 9 | 642.4 | 10 | 651.1 | — | —    | 12.39 | —     | —     | 12.39 | —    |
| 4  | 9 | 466.2 | 10 | 689.8 | 11 | 476.5 | 12.94 | 12.94 | 12.94 | 12.94 | 0.00 |
| 5  | 7 | 506.0 | 8 | 722.5 | 9 | 474.6 | 10.64 | 10.65 | 10.64 | 10.64 | 0.01 |
| 6  | 6 | 699.8 | 7 | 662.5 | — | —     | 8.86  | —     | —     | 8.86  | —    |
| 7  | 6 | 635.8 | 7 | 716.2 | 8 | 187.9 | 9.17  | 9.18  | 9.18  | 9.18  | 0.01 |
| 8  | 1 | 599.6 | 2 | 745.7 | 3 | 328.0 | 3.52  | 3.50  | 3.51  | 3.51  | 0.02 |
| 9  | 1 | 745.7 | 2 | 587.8 | — | —     | 2.77  | —     | —     | 2.77  | —    |
| 10 | 1 | 217.6 | 2 | 728.3 | 3 | 634.5 | 4.07  | 4.09  | 4.07  | 4.08  | 0.02 |
| 11 | 4 | 703.6 | 5 | 680.3 | — | —     | 6.59  | —     | —     | 6.59  | —    |
| 12 | 3 | 491.0 | 4 | 752.6 | 5 | 519.6 | 6.09  | 6.11  | 6.10  | 6.10  | 0.01 |
| 13 | 4 | 323.6 | 5 | 738.5 | 6 | 611.6 | 7.48  | 7.49  | 7.48  | 7.48  | 0.01 |
| 14 | 6 | 674.8 | 7 | 691.7 | — | —     | 9.01  | —     | —     | 9.01  | —    |
| 15 | 7 | 700.9 | 8 | 663.4 | — | —     | 10.01 | —     | —     | 10.01 | —    |
| 16 | 7 | 620.8 | 8 | 715.8 | 9 | 242.2 | 10.35 | 10.35 | 10.35 | 10.35 | 0.00 |
| 17 | 9 | 547.4 | 10 | 691.8 | 11 | 374.3 | 12.75 | 12.75 | 12.75 | 12.75 | 0.00 |
| 18 | 9 | 327.9 | 10 | 683.2 | 11 | 563.3 | 13.15 | 13.15 | 13.15 | 13.15 | 0.00 |
| N    | | | | | | | | | | 18    | 11    |
| Ave. | | | | | | | | | | 9.03  | 0.008 |
| Min. | | | | | | | | | | 2.77  | 0.00  |
| Max. | | | | | | | | | | 13.15 | 0.02  |

TABLE 3

| CENTRAL LEVELS OF GOLF BALLS AS MEASURED BY USING THE MEASURING METHOD ACCORDING TO THE PRESENT INVENTION Launch Angles of Golf Balls, θ (in deg.) | | Launch Angles of Golf Balls as Measured by Photographic Measuring Method | Difference |
|---|---|---|---|
| Average (A) | R | (B) | (A) - (B) |
| 1 | 11.45 | 0.01 | 11.14 | +0.31 |
| 2 | 11.23 | — | 10.93 | +0.30 |
| 3 | 12.39 | — | 12.28 | +0.11 |
| 4 | 12.94 | 0.00 | 12.71 | +0.23 |
| 5 | 10.64 | 0.01 | 10.40 | +0.24 |
| 6 | 8.86 | — | 8.42 | +0.44 |
| 7 | 9.18 | 0.01 | 9.14 | +0.04 |
| 8 | 3.51 | 0.02 | 3.55 | −0.04 |
| 9 | 2.77 | — | 2.79 | −0.02 |
| 10 | 4.08 | 0.02 | 4.26 | −0.18 |
| 11 | 6.59 | — | 6.48 | +0.11 |
| 12 | 6.10 | 0.01 | 5.94 | +0.16 |
| 13 | 7.48 | 0.01 | 7.40 | +0.08 |
| 14 | 9.01 | — | 8.77 | +0.24 |
| 15 | 10.01 | — | 9.97 | +0.04 |
| 16 | 10.35 | 0.00 | 10.14 | +0.21 |
| 17 | 12.75 | 0.00 | 12.80 | −0.05 |
| 18 | 13.15 | 0.00 | 12.91 | +0.24 |
| N | 18 | 11 | 18 | 18 |
| Ave. | 9.03 | 0.008 | 8.89 | 0.14 |
| Min. | 2.77 | 0.00 | 2.79 | −0.18 |
| Max. | 13.15 | 0.02 | 12.91 | 0.44 |

The light source of the laser marker 15 is arranged to emit a semiconducting laser beam of 40 mW in consumptive power and 790 nm in wave length. The convex lens 16 is approximately 140 mm in the diameter thereof and approximately 300 mm in the focal distance thereof.

With such an arrangement, the masking plate member 18 is allowed to have the parallel light band $L_1$ radiated thereto, whereby this parallel light band $L_1$ is incident upon the ray receiving means 2 through the holes 17 of the masking plate member 18 in the form of the ray L of light.

It will therefore be understood that the use of the modified type ray projecting means 1 achieves simple measurement of launch angles of flying golf balls as the employment of the measuring installation described in the foregoing and shown in FIG. 1.

Figure 6:
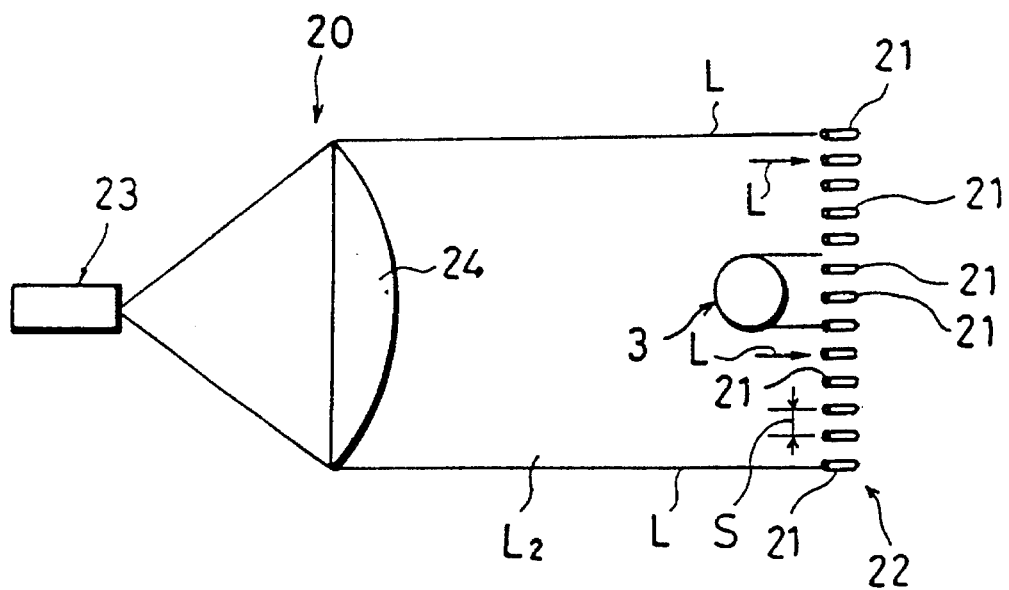
FIG. 6 is a schematic view of a principal portion of the measuring installation of the present invention according to a third preferred embodiment thereof.

FIG. 6 shows a different type measuring installation according to a third preferred embodiment of the present invention. This measuring installation is provided with a ray projecting means 20 which emits a parallel light band $L_2$, and a ray receiving means 22 which comprises a plurality of photosensors 21. As illustrated in FIG. 1, the amplifier portion 9, the instrumentation means 4, the interface 11, and the computer 5 are connected to this ray receiving means 22.

On the other hand, the ray projecting means 20 is provided with the laser marker 23, and the convex lens 24. The ray of light emitted by means of the marker 23 is changed to the parallel light band $L_2$ through the convex lens 24, and is incident upon the photosensors 21. Thereafter, the parallel light band $L_2$ is ramified into a plurality of parallel rays of light L at the photosensors 21, and the plurality of parallel rays of light L are received by using the ray receiving means 22.

In order to ensure that the ray receiving means 22 are respectively allowed to receive one of the parallel rays of light, the photosensors 21 are desired to be respectively provided with a small-diameter cylinder type member for preventing an oblique incidence of a ray of light on them. In this case, the photosensors 21 are arranged in a plane of the parallel light band L2 such that the distance S between every two neighboring photosensors 21 does not exceed the radius r of the flying spherical object 3. As a result, the measuring installation comprising the ray projecting means 20 and the ray receiving means 22 which are described in the preceding allows the flying spherical object to block off at least two rays L of light, whereby a wide measuring range is provided to facilitate the measurement of the launch angles thereof.

In order to measure a lateral deviation angle (horizontal launch angle) of the golf ball, the measuring apparatus according to the first, second and third preferred embodiments of the present invention are vertically arranged.

A vertical launch angle of the golf ball in flight is measured through a silhouette thereof which is projected on a surface perpendicular to the optical axes of the rays L of light (i.e. the plane XZ). However, it is feasible by measuring a lateral deviation angle of the golf ball to find the vertical launch angle of the golf ball also on a surface including the trajectory of the golf ball in flight, namely, an actual vertical launch angle of the ball.

In the present invention, the spherical object is an object which is circular in the sectional configuration thereof, and includes an object which can be regarded in the sectional configuration thereof as circular. As a result, the measuring installation and the measuring method of the present invention which are described in the foregoing can measure an instantaneous spatial position, namely, a central level of a spherical object in flight if this spherical object is circular in the sectional configuration thereof, or can be regarded in the sectional configuration thereof as circular.

The present invention is not limited in the application thereof to the preferred embodiments described in the foregoing. In the foregoing embodiments, transmission type photosensors are used. However, reflection type photosensors are also selectively applicable. The measuring installation according to the present invention can be freely changed in the design thereof without departing from the scope of the present invention. For example, the parallel rays L of light emitted by using the ray projecting means 1 may be varied in the number, the intervals of place, and other conditions thereof as desired if a flying spherical object 3 crosses at least two rays L of light.

Moreover, the rays L of light may be at regular intervals or at irregular intervals. Also, if a flying spherical object crosses three or more rays L of light, a launch angle thereof can be measured with higher accuracy. This is for the following reason.

In order to find a launch angle of a flying golf ball, it is necessary to know the central level of the flying golf ball. This central level is given by finding the time for which two relative photodiodes 7 are shielded from the rays L of light. Therefore, if a flying spherical object 3 crosses three or more rays L of light, it is feasible to learn the time for which three or more relative photodiodes 7 are shielded from the rays L of light, thereby allowing the launch angle of the flying golf ball to be measured with higher accuracy.

Therefore, the measuring installation according to the present invention can measure a central level of a flying spherical object 3 without any contact therewith, provide a wider measuring area, and readily measure a vertical launch angle and a horizontal launch angle (lateral deviation angle) of the flying spherical object 3 with higher accuracy by using the central level thereof which is as measured.

Also, this measuring installation is simple in the overall construction thereof, and can readily achieve each necessary calculation by means of the computer 5.

We claim:

1. An apparatus for measuring an instantaneous spatial position of a spherical object in flight, comprising:

ray projecting means for emitting a plurality of parallel rays of light which are arranged at known locations within a single plane wherein the distance between each neighboring ray of light is set such as to be less than the radius of said spherical object;

ray receiving means for detecting the incidences of said rays of light on said ray receiving means and the interceptions of said rays of light;

an instrumentation means for measuring the time for which said rays of light are blocked off by said spherical object, upon detecting signals given by said ray receiving means; and operation means for computing an instantaneous spatial position of said spherical object in flight on the basis of the locations of the rays of light which are blocked off, and the interception time of said rays of light which is measured by using said instrumentation means.

2. The apparatus for measuring an instantaneous spatial position of a spherical object in flight as set forth in claim 1, wherein the ray projecting means comprises a plurality of semiconductor type laser markers vertically arranged at predetermined intervals.

3. The apparatus for measuring an instantaneous spatial position of a spherical object in flight as set forth in claim 1, wherein the ray projecting means comprises:

a laser marker which radiates a semiconducting laser beam expanded in a fan-shaped configuration by means of a cylindrical lens;

a convex lens which changes said semiconducting laser beam expanded in a fan-shaped configuration to a parallel light band; and a masking plate through which a plurality of holes are vertically made.

4. The apparatus for measuring an instantaneous spatial position of a spherical object in flight as set forth in claim 1, wherein the ray receiving means comprises a plurality of photodiodes vertically arranged at a predetermined intervals.

5. The apparatus for measuring an instantaneous spatial position of a spherical object in flight, as set forth in claim 1, wherein an amplifier portion is provided with an automatic gain control circuit, and wherein the ray receiving means comprises a plurality of photodiodes vertically arranged at predetermined intervals, the instrumentation means measures as the interception time of the rays of light the time for which the output of said amplifier portion is less than a specified value, and a detection is performed upon photodiodes shielded from the rays of light by the spherical object in flight.

6. The apparatus for measuring an instantaneous spatial position of a spherical object in flight as set forth in claim 1, wherein the ray receiving means comprises a plurality of photodiodes vertically arranged at predetermined intervals, and the calculating means comprises a computer in which the levels of photodiodes, the distance between every two neighboring photodiodes, the radius of the spherical object, and the distance from the shot point of the spherical object to the single plane.

7. An apparatus for measuring an instantaneous spatial position of a spherical object in flight, comprising:

ray projecting means for emitting a parallel light band;

a plurality of ray receiving means for admitting said parallel light band only in the form of a plurality of parallel rays of light, each said ray receiving means being arranged in a known position in a plane of said parallel light band and the distance between any two neighboring ray receiving means is set such as to be less than the radius of said spherical object;

an instrumentation means for receiving detecting signals from the plurality of ray receiving means to thereby measure the time for which said rays of light are blocked off by said spherical object; and an operation means for computing an instantaneous spatial position of said spherical object in flight on the basis of the locations of the rays of light which are blocked off and the interception time of said rays of light which is measured by using said instrumentation means.

8. The apparatus for measuring an instantaneous spatial position of a spherical object in flight as set forth in claim 7, wherein the ray projecting means comprises:

a laser marker; and a convex lens for changing into the parallel light band a laser beam given by the laser marker.

9. The apparatus for measuring an instantaneous spatial position of a spherical object in flight as set forth in claim 7, wherein the plurality of ray receiving means comprise a plurality of optical sensors vertically arranged at predetermined intervals.

10. The apparatus for measuring an instantaneous spatial position of a spherical object in flight as set forth in claim 7, wherein an amplifier portion is provided with an automatic gain control circuit, the plurality of ray receiving means comprise a plurality of optical sensor means vertically arranged at predetermined intervals, the instrumentation means measures as the interception time of the rays of light the time for which the output of said amplifier portion is less than a specified value, and a detection is performed upon optical sensor means shielded from the rays of light by the spherical object in flight.

11. The apparatus for measuring an instantaneous spatial position of a spherical object in flight as set forth in claim 1, wherein the ray receiving means comprises a plurality of optical sensor means vertically arranged at predetermined intervals, and the operation means comprises a computer in which the levels of the optical sensor means, the distance between every two neighboring optical sensor means, the radius of the spherical object, and the distance from the shot point of the spherical object to the parallel light band are inputted.

12. The apparatus for measuring an instantaneous spatial position of a spherical object in flight as set forth in claim 1 or claim 7, wherein the spherical object is a golf ball.

13. The installation for measuring an instantaneous spatial position of a spherical object in flight as set forth in claim 1 or claim 7, wherein the spherical object is a tennis ball.

14. A method for measuring a vertical launch angle of spherical object, comprising the steps of:

passing said spherical object through at least two parallel rays of light in which the respective distances and positions of said rays of light from the shot point of the spherical object are known quantities, thereby blocking the transmission of said rays of light from at least one light projector to at least two light receivers to thereby measure the interception time of each ray of light; and computing the position of said spherical object on the basis of the measured value of the interception time of each ray of light.

15. The method for measuring a vertical or horizontal launch angle of the spherical object as set forth in claim 14, wherein said spherical object is a golf ball.

16. The method for measuring a vertical or horizontal launch angle of the spherical object as set forth in claim 14, wherein said spherical object is a tennis ball.

* * * * *